United States Patent [19]

Sharony et al.

[11] Patent Number: 5,742,593
[45] Date of Patent: Apr. 21, 1998

[54] ON-LINE DISTRIBUTED TDMA/FDMA/ CDMA LINK ASSIGNMENT IN MOBILE RADIO NETWORKS WITH FLEXIBLE DIRECTIVITY

[75] Inventors: Jacob Sharony, Port Washington; Alexander C. Sevdinoglou, Commack, both of N.Y.

[73] Assignee: Hazeltine Corporation, Greenlawn, N.Y.

[21] Appl. No.: 521,101

[22] Filed: Aug. 29, 1995

[51] Int. Cl.$^6$ .................. H04J 4/00; H04J 13/04
[52] U.S. Cl. .................. 370/330; 370/342; 370/436; 370/441; 370/280
[58] Field of Search .................. 370/277, 280, 370/294, 330, 335, 336, 337, 342, 343, 344, 345, 347, 441, 442, 478, 479, 480, 498, 436, 458, 468, 201; 455/49.1, 54.1

[56] References Cited

U.S. PATENT DOCUMENTS

| | | | |
|---|---|---|---|
| 4,754,453 | 6/1988 | Eizenhofer | 370/95 |
| 4,763,322 | 8/1988 | Eizenhofer | 370/95 |
| 5,001,703 | 3/1991 | Johnson et al. | 370/79 |
| 5,210,771 | 5/1993 | Schaeffer et al. | 375/1 |
| 5,539,730 | 7/1996 | Dent | 370/29 |

OTHER PUBLICATIONS

L. Hu, Distributed Code Assignments for CDMA Packet Radio Networks, IEEE/ACM Transactions on Networking, Dec. 1993, at p. 668, et seq.

I. Chlamtac, et al., A Topology Transparent Link Activation Protocol for Mobile CDMA Radio Networks, IEEE Journal on Selected Areas in Communications, Oct. 1994, at 1426, et seq.

S. Ramanathan, et al., Scheduling Algorithms for Multihop Radio Networks, IEEE/ACM Transactions on Networking, Apr. 1993, at 166, et seq.

I. Chlamtac, et al., A Link Allocation Protocol for Mobile Multi-Hop Radio Networks, Proceedings of GLOBECOM '85, Dec. 1985, at 238, et seq.

*Primary Examiner*—Douglas W. Olms
*Assistant Examiner*—Matthew C. Phillips
*Attorney, Agent, or Firm*—Edward A. Onders; Leo Zucker

[57] ABSTRACT

When establishing a link (i–j) between two nodes i, j in a mobile radio communications network, transmission parameters are assigned such that conflicts and interference with nodes that neighbor the nodes i and j are avoided. A time-slot and a frequency-code value are assigned to the link (i–j) from a defined set of time-slots T, and from a defined set of frequency-code values FC. Set T contains time slots (t) during which links in the network can be activated, and set FC contains frequency-code values (f, c) each of which specifies a frequency or a frequency-code pair for association with the links. A time slot $t_k$ is first chosen from set T which slot is not in use for links between node i and nodes neighboring node i, or for links between node j and nodes neighboring node j. A frequency-code value $(f, c)_1$ is next chosen from set FC which value is not in use by any node that neighbors node i or by any node that neighbors node j, during the chosen time slot $t_k$. If no frequency-code value $(f, c)_1$ is available during the chosen time-slot $t_k$, $t_k$ is removed from the set T of available time slots and another available time slot is chosen until a frequency-code value $(f, c)_1$ is available for the link (i–j) during the chosen time slot.

17 Claims, 4 Drawing Sheets

ON-LINE DISTRIBUTED TDMA/FDMA/ CDMA LINK ASSIGNMENT IN MOBILE RADIO NETWORKS WITH FLEXIBLE DIRECTIVITY

BACKGROUND OF THE INVENTION

1. Field of the Invention

The present invention relates to implementation of communications links between nodes in a wireless communications network, and particularly to the assignment of time slots, frequencies, and codes to pairs of linked nodes in a manner that avoids conflicts and interference with nodes neighboring the linked nodes.

2. Description of the Known Art

Communications networks are defined by a number of user stations or nodes, wherein each node may at any time wish to communicate with another node in the network. If the network nodes are mobile, it then becomes necessary to use radio as the communications medium between the nodes.

In a digital packet radio communications network, potential interference among network users may be avoided by (1) assigning different radio frequencies to pairs of nodes to be linked with one another, i.e, a technique referred to as frequency division multiple access (FDMA); (2) using a time division multiple access (TDMA) scheme in which different transmitting time slots are allotted to different linked node pairs; and (3) a code division multiple access (CDMA) technique.

The TDMA scheme enables more than one pair of nodes to be linked on a common frequency channel, by assigning each linked pair a different time slot during which to transmit data to one another in successive time frames. Packets of data from the same time slot are then combined over successive time frames to complete a full message. Therefore, as long as each pair of communicating nodes transmits data only during an assigned time slot, there can be no conflict with data transmitted by other nodes during other time slots. Both of the FDMA and the TDMA assignment schemes are referred to as orthogonal techniques, the former realizing orthogonality in a frequency domain and the latter achieving orthogonality in the time domain.

The CDMA assignment technique is a quasi-orthogonal one, in that it allows for overlapping of different data transmissions in the frequency and in the time domains by using different codes. Correlation detection processes are carried out by the node receivers so that only those receivers for which transmitted data is intended will respond to the data. For example, in a direct sequence spread spectrum communications network, each linked pair of nodes is assigned a unique pseudo-random noise (PN) code sequence. The code is used by the transmitting node to spread a modulated carrier over a given frequency band, and the receiving node uses the identical code to despread and then demodulate the received carrier.

In packet communications systems including mobile radio networks, radio is used as the physical medium in linking an array of user node stations. Each station has a transmitter, a receiver, and an antenna for radiating signals of sufficient strength to be received by other nodes in the network. One node may be linked to another node by a direct radio path, i.e., a single-hop link, or two end nodes may be linked via a third intermediate node in a multi-hop network array to facilitate reliable communications, particularly among mobile nodes.

Whenever a new link is to be defined between network nodes, management information must be provided with respect to available time slots, frequency channels and codes open for assignment to avoid conflicts or interference with currently linked nodes in the network. Such network management functions may be centralized in which case a central scheduler has full responsibility for each assignment. For example, in current analog FDMA cellular radio telephone networks, mobile user nodes communicate selectively with one another via fixed base stations, and the later manage the assignment of frequency channels to communicating mobile users with control signals to avoid co-channel interference from two user nodes transmitting simultaneously on a common frequency. Most medium access assignment schemes have centralized control which strongly depends on network size (number of nodes). Also, overall assignment re-computations must be performed due to node mobility, i.e., existing links are disrupted when adding or activating new links. As a result, a significant portion of available bandwidth is used only for management and control of the network.

Network management functions may also be distributed, in which case all nodes are provided with means to implement assignments pertaining to their own operations. Distributed network management control is preferable both in terms of reliability and performance. First, a distributed link assignment does not rely on proper operation of a central scheduling station or node. Second, all nodes act in a coordinated manner inasmuch as each node is configured to execute a common assignment algorithm based on the exchange of control information among all nodes of the network. See generally, E. C. Jordan, Reference Data for Engineers, at pages 26-1 to 26-32 (7th ed. 1985).

Primary and secondary conflicts are known to occur in radio networks. Primary conflicts occur when two or more nodes transmit simultaneously to a common node which is within "hearing distance" or range of the transmitting nodes. All nodes within hearing distance or transmission range of a transmitting node in a network are hereafter referred to as nodes "neighboring" the transmitting node. Secondary conflicts occur when transmissions from one or more nodes not intended to a specific neighboring node, are received by the neighboring node causing an interference.

In addition, time-slots, frequency channels and codes may have to be re-assigned to other links upon a change in direction of traffic flow between two linked nodes, to avoid interference with the other links.

SUMMARY OF THE INVENTION

An object of the invention is to provide a link assignment scheme that can be implemented by individual nodes of a radio communications network.

Another object of the invention is to implement link assignments in a communications network, such that any two nodes within hearing distance of one another can form a reliable TDMA, FDMA and CDMA link.

A further object of the invention is to implement distributed link assignments in a communications network, such that any two nodes within hearing distance of one another can form a link without potential conflict or interference with neighboring nodes.

Another object of the invention is to implement link assignments to nodes in a communications network, such that the direction of transmission between a pair of linked nodes can be changed dynamically and independently of other link assignments in the network.

According to the invention, a method of assigning a transmission link (i–j) between two nodes i, j in a communications network, whereby potential conflicts and interference with other nodes neighboring the nodes i, j are avoided, comprises an assignment of a time-slot and a frequency-code value to the link (i–j) from a defined set of time-slots T, and from a defined set of frequency-code values FC. Set T contains time slots (t) during each of which links in the network can be activated, and set FC contains frequency-code values (f, c) each value specifying a frequency or a frequency-code pair for association with the links in the network. In a first step, a time slot $t_k$ is chosen from set T which slot is not in use for links established between node i and nodes neighboring node i, or for links established between node j and nodes neighboring node j. In a second step, a frequency-code value $(f, c)_1$ is chosen from set FC which value is not in use by any node that neighbors node i or by any node that neighbors node j during the chosen time slot $t_k$. The designations k and l refer to a currently chosen time-slot and a currently chosen frequency-code value, respectively.

If no frequency-code value $(f, c)_1$ is available during the chosen time-slot $t_k$, the process returns to the first step after removing $t_k$ from the set T of available time slots.

The present link assignment scheme may be distributed by exchanging such network management information that when node i is to be linked with node j; the nodes i, j can establish the link (i–j) by determining existing time slot and frequency-code value assignments to nodes neighboring node i and nodes neighboring node j, assigning an available time slot $t_k$ and an available frequency-code value $(f, c)_1$ to the link (i–j), and informing nodes neighboring node i and node j of the time slot $t_k$ and the frequency-code value $(f, c)_1$ assigned to the link (i–j).

According to another aspect of the invention, a communications network node structure comprises transmitter means for transmitting information to other nodes with which a link is desired; receiver means for receiving information from the other nodes; and controller means coupled to the transmitter means and to the receiver means. The controller means is operative to (a) acquire through the receiver means information corresponding to existing time slot and frequency-code value assignments at each neighboring node, (b) first choose from a set T an available time slot $t_k$ which is not in use for links established between node i and nodes neighboring node i, or for links established between node j and nodes neighboring node j; (c) second choose from a set FC an available frequency-code value $(f, c)_1$ which is not, during the chosen available time slot $t_k$, in use by any node that neighbors node i, or by any node that neighbors node j; (d) return, if no frequency-code value $(f, c)_1$ is available during the chosen time slot $t_k$, to the operation (b) after removing $t_k$ from the set T of available time slots; and (e) assign a chosen time slot $t_k$, and a chosen frequency-code value $(f, c)_1$ for a link (i–j) between the nodes i, j; wherein T is a defined set of available time slots (t) during each of which slots links in the network can be activated, and FC is a defined set of frequency-code values (f, c) each of which specifies a frequency or a frequency-code pair for association with the links in the network.

For a better understanding of the present invention, together with other and further objects, reference is made to the following description taken in conjunction with the accompanying drawings, and the scope of the invention will be pointed out in the appended claims.

DETAILED DESCRIPTION OF THE INVENTION

Figure 1:
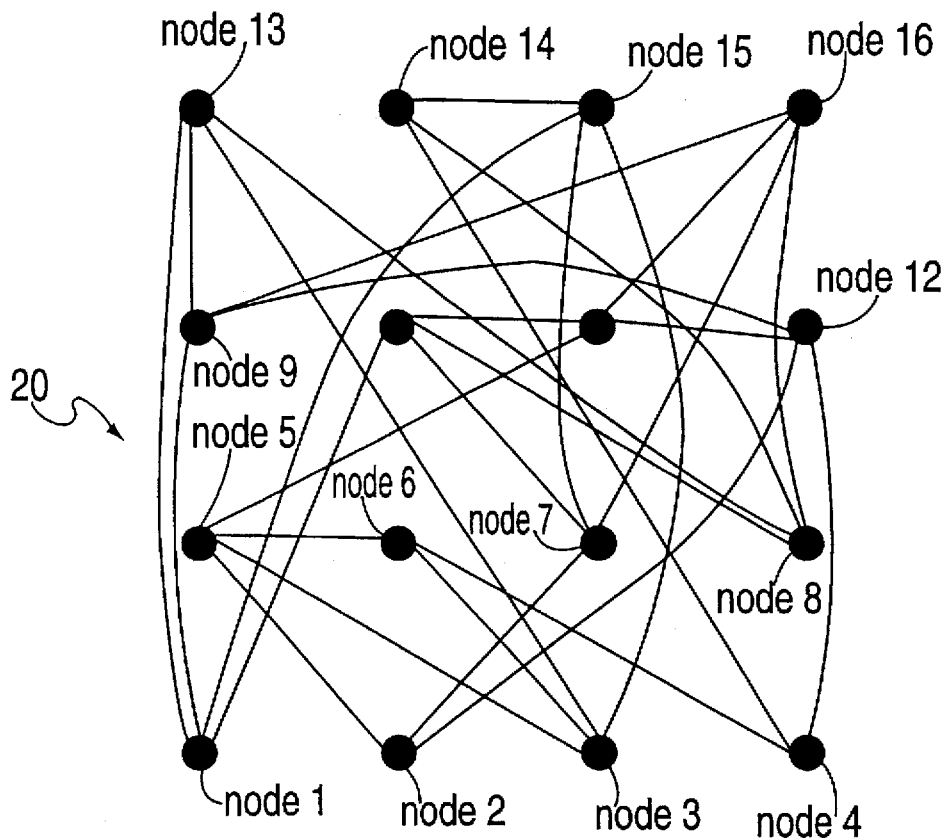
FIG. 1 is a diagram of a mobile radio communications network in which the present invention can be applied.

FIG. 1 is a diagram of a communications network 20 defined by an array of nodes numbered 1–16. For purposes of illustration only, and without limitation of the scope of the present invention, it is assumed that the network has 16 nodes some or all of which may be mobile relative to other nodes in the network.

Figure 2:
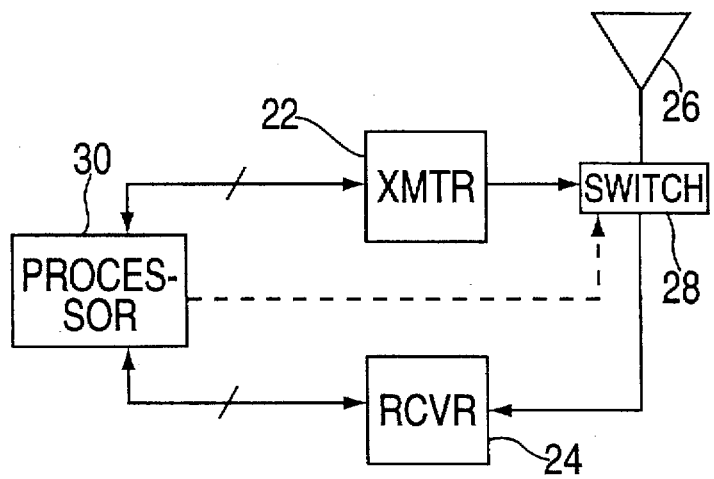
FIG. 2 depicts a typical node in the network of FIG. 1.

It is also assumed that:

1. Each of the nodes 1–16 has a transmitter 22 and a receiver 24. See FIG. 2;

2. Each node has an antenna 26, and switch/interface 28 for matching and coupling the antenna 26 to the node transmitter 22 and the receiver 24, according to operation of a processor/controller unit 30 included in each node; and 3. Each link between two nodes is activated at least once in each time frame.

Broadly, the present invention encompasses a TDMA, FDMA and CDMA link assignment scheme for nodes in a communications network, wherein the network has N nodes and a degree of Δ; and wherein Δ is the maximum number of active or "logical" communications links of which any one node may be part. The word "logical" is used herein to refer to an active communications link between two nodes. Active or logical links are overlaid on top of a network in which each node is merely physically "connected" with neighboring nodes through a physical medium, e.g., by each node's radio transmission coverage.

For example, FIG. 1 depicts a 16-node network 20 which may be fully connected (everyone is capable of hearing everyone else), with a multi-hop logical topology overlaid on top of the 16 physically connected nodes. Note that node i is linked to communicate with node 16 via node 9, rather than directly.

In general, the network 20 need not be fully connected. For example, in the case of a radio communications network, physical connectivity between any two network nodes may be delimited by the distance between the nodes and the effective transmission range of each node. See FIG. 6.

When a time slot, and a frequency-code value is assigned to establish an active link between a pair of nodes in the network 20, a primary conflict may arise if the nodes to be linked also communicate with any of their neighboring nodes during the same time slot. As earlier defined, nodes "neighboring" a particular node are all those nodes within hearing distance of the particular node.

A secondary conflict can arise if transmissions from either of two nodes to be linked are received by neighboring nodes operating in the same time slot and with the same frequency-code value assigned to the nodes to be linked. Both of these conflicts are avoided via the present link assignment scheme, as follows.

According to the invention, each link between two nodes i, j in a network is assigned an ordered triplet of time-slot, frequency, and code (t, f, c). As explained further below, the present technique also applies if a frequency value (f) or a code value (c) are fixed values for a given network, as well as when no code value (c) is employed in links within the network.

Specifically, a given link in the network is assigned in two phases. In the first phase, a time slot is assigned to the link. The time slot assigned to the nodes i, j to be linked, must differ from any of the time slots being used for active or "logical" links between either of the nodes i, j; and nodes neighboring the nodes i, j. The first phase therefore avoids the mentioned primary conflicts.

In the second phase, a frequency-code value is assigned to the link (i–j). The frequency-code value assigned to the new link must differ from any of the frequency-code values used by any node that neighbors node i or by any node that neighbors node j, during the time slot chosen in the first phase. Accordingly, the mentioned secondary conflicts will be avoided by the second phase.

The present assignment scheme may be expressed as set out below. It is assumed that the nodes i, j have means for acquiring knowledge of existing assignments at their neighboring nodes. For example, such acquisition may be accomplished through an advertising process by passing assignment information from each node to its neighbors. This information includes the time-slots and frequency-code values which are in use by the advertising node, or just incremental changes in such information. For example, the information can be passed via a dedicated channel or a time-slot for the advertising node. Other ways are also possible, e.g., when the advertised information includes only incremental changes in the assignment, a carrier sense multiple access (CSMA) protocol can be used to allow multiple nodes to advertise within a dedicated time-slot.

The output of the present assignment scheme is an assignment to the link (i–j) of an ordered triplet of time-slot, frequency and code—(t, f, c).

The following notations are used:

T—set of available time-slots.

FC—set of available frequency-code values.

$T_r$—set of time-slots in use by node r.

$FC_r^h$—set of frequency-code values which are in use by neighbors of node r at time-slot $t_h$.

The Present Assignment Scheme

Sets T and FC are defined and may be ordered arbitrarily at the outset; k and 1 denote a currently chosen time-slot and frequency-code value, respectively.

1. Choose $t_k \in T-(T_i \cup T_j)$, where k is, for example, the least order number; if no time-slot is available, go to step 4.

2. Choose $(f, c)_1 \in FC-(FC_i^k \cup FC_j^k)$, where 1 is, for example, the least order number; if no frequency-code value is available, $T \leftarrow T-\{t_k\}$, and go to step 1.

3. Stop; the triplet $(t_k, (f, c)_1)$ is the (i–j) link assignment.

4. Stop; link (i–j) cannot be assigned.

In the event that neither FDMA nor CDMA is available in a given network, i.e., the network is pure TDMA, only one frequency value or channel (f) is assignable, and no code (c) is available. In step 2, above, the present scheme "compensates" for a lack of plural frequencies or codes by choosing, e.g., the least order time-slot during which neighboring nodes are not using the channel (f), i.e., when the neighboring nodes are not operating.

Figure 3:
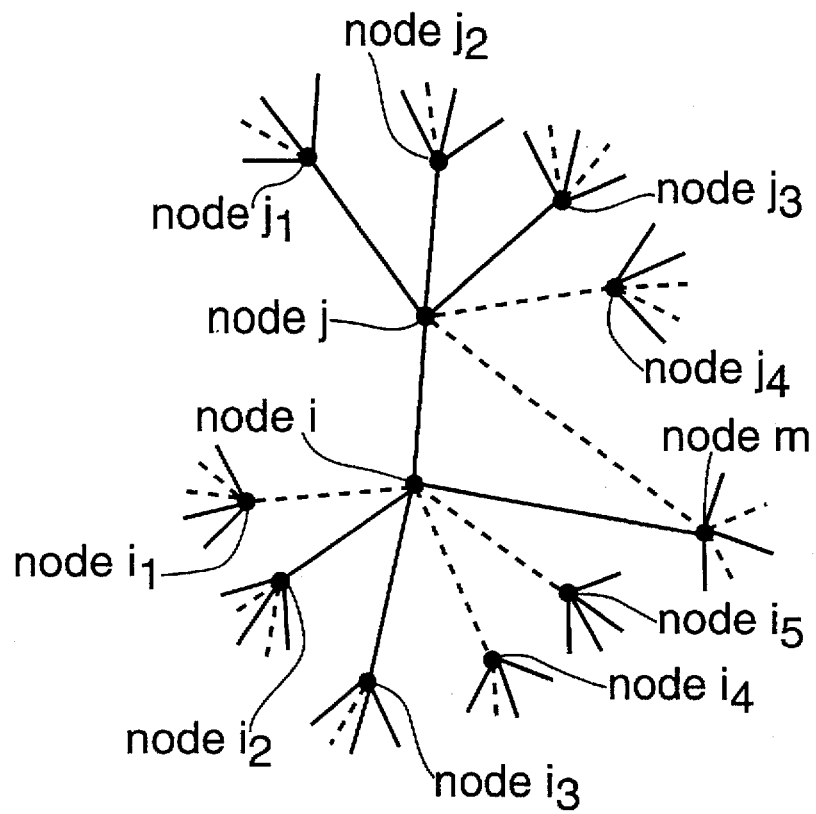
FIG. 3 is a diagram of a pair of linked nodes i, j; and nodes that neighbor the linked nodes i, j.

The following example is presented with reference to FIG. 3. The figure shows nodes i and j to be linked, and nodes neighboring the nodes i, j. In addition to the physical connectivity between the nodes i, j and their neighbors, certain logical (activated) links presently exist between them. Those nodes joined by solid lines represent nodes with active links between them, and nodes joined by dashed lines represent nodes between which physical connectivity exists but which have not yet been actively linked. Nodes $i_1, i_2, i_3, i_4, i_5$ and m are neighbors of node i; and nodes $j_1, j_2, j_3, j_4$ and m are neighbors of node j. Node m is a mutual neighbor of node i and node j.

In the first phase, a time-slot for link (i–j) is assigned by choosing an available time slot having, for example, the least order number, and which is not in use by logical links $(i-i_2), (i-i_3), (i-m), (j-j_1), (j-j_2)$ and $(j-j_3)$.

In the second phase, a frequency-code value is chosen having, e.g., the least order number, and which is not in use during the above chosen time-slot by nodes $i_1, i_2, i_3, i_4, i_5, j_1, j_2, j_3, j_4$ and m. Note that the search for a frequency-code value considers all neighboring nodes, i.e., those nodes connected both logically and physically to node i and to node j.

In the event each of the linked nodes i, j, operates in a half duplex mode wherein each node either transmits or receives, but does not do both at a given instant of time, the assigned time-slot may be divided flexibly between two uni-directional links i→j and i←j, without disturbing the operation of other existing links. The division may be made according to the aggregate bandwidth needs for information to be transmitted over each directional link (e.g., 50:50, 30:70, or the like). The aggregate information may be comprised of information originating from node i or from node j, and any other nodes in the network which are communicating via the link (i–j). The flexible or dynamic division of the assigned time slot with corresponding changes of direction of transmission between the nodes i, j does not require a re-assignment to any of the existing links. This is in contrast to prior assignment methods in which the transmission direction of specific links in a network depends on the direction of other links.

Figure 4:
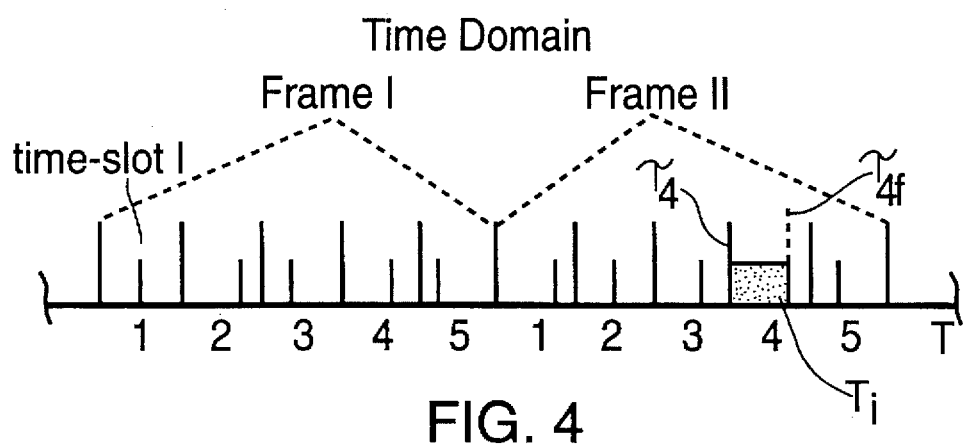
FIG. 4 shows an example of an assignment of a time-slot to a link according to the invention.
Figure 5:
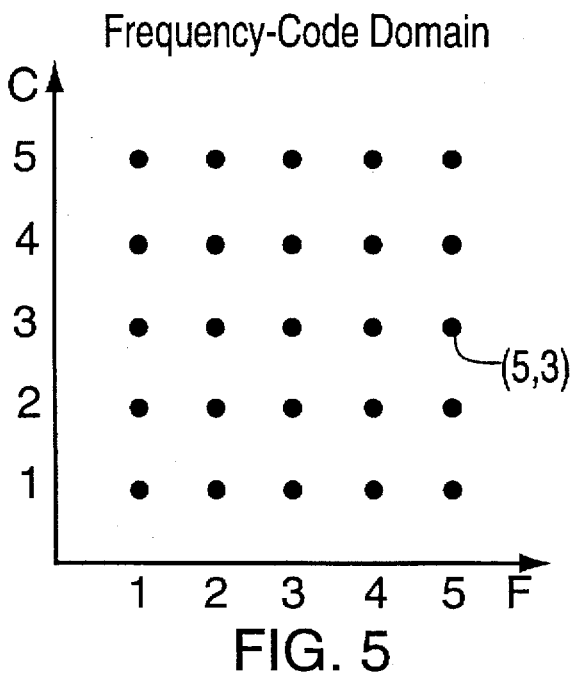
FIG. 5 shows an example of an assignment of a frequency-code pair to a link according to the invention.

FIG. 4 depicts an example of an assignment using time-slot $t_4$, and FIG. 5 shows the frequency-code pair (5, 3) chosen in the second phase of the present scheme. Note that there are 25 different frequency-code pairs in the example of FIG. 5.

The CDMA codes (c) may correspond to direct sequence spread spectrum PN codes to be applied over a set of frequency channels each having a center carrier frequency (f) and a certain bandwidth. The codes (c) may be such that the spread modulated carriers of two adjacent frequency channels do not overlap, thus allowing code reuse in different frequency channels. For example, assume the available spectrum is 200 MHz and there are ten frequency channels spaced 20 MHz apart. If the data signal bit rate (baseband) is 100 Kbps, the spreading signal (PN code) bit rate can approach about 100 times the baseband signal rate, i.e., 10 Mbps.

FIG. 4 also depicts a portion of time slot $t_4$ allocated for a uni-directional link (e.g., from node i to node j). The time portion is shown by the shaded area $T_i$ on time axis T, and is bounded on one side by a hard boundary $\tau_4$ and a "flexible" boundary $\tau_{4f}$. Such a time-slot use allocation may be implemented, for example, by exchanging information between the nodes i, j, wherein each node notifies its aggregate bandwidth need, and negotiates an allocation of the time-slot.

For example, let the total capacity of bi-directional link (i–j) be C, and the aggregate bandwidth needs of nodes i and j be $\lambda_i$ for unidirectional link i j, and j for uni-directional link i←j; where $C \geq \lambda_i + \lambda_j$. Assume that and it is desired to define a time splitting ratio of the time-slot assigned to bi-directional link (i–j) which results in a minimum link delay. It can be shown that the desired splitting ratio $\{T_{i \to j}: T_{i \leftarrow j}\}$, is $\{\frac{1}{2} + (\lambda_i - \lambda_j)/2C\}: \{\frac{1}{2} - (\lambda_i - \lambda_j)/2C\}$.

Figure 6:
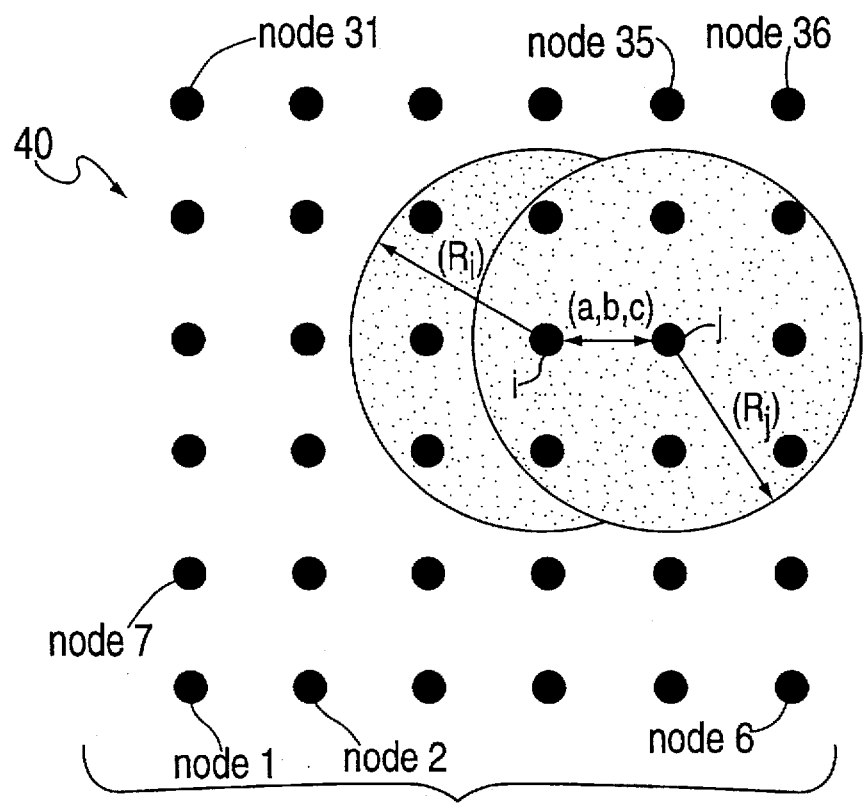
FIG. 6 illustrates a coverage space of two linked nodes based on the transmission range of each node, and a section of the network where the link assignment can be reused.

FIG. 6 represents a radio communications network 40 in which physical and logical connectivity between any two of 36 nodes (e.g., nodes i, j) is delimited by the effective transmitting range of each node i, j, and the physical distance between the nodes i, j. Because of limited transmission radii $R_i$, $R_j$ for the nodes i, j in the network 40, it is possible that an assigned triplet (a, b, c) to bi-directional link (i⇌j) comprised of time-slot a, frequency b and code c; can be reused by other nodes outside the union of the transmission spaces of nodes i, j (i.e., outside the shaded area). The transmission spaces of nodes i, j are defined by the transmission radii $R_i$, $R_j$, as shown in FIG. 6.

The network nodes need not be arrayed in a generally planar configuration as in FIGS. 1 and 6, but may also be arrayed and have relative mobility in a three-dimensional spatial region by, e.g., carrying each node on an associated aircraft.

Figure 7:
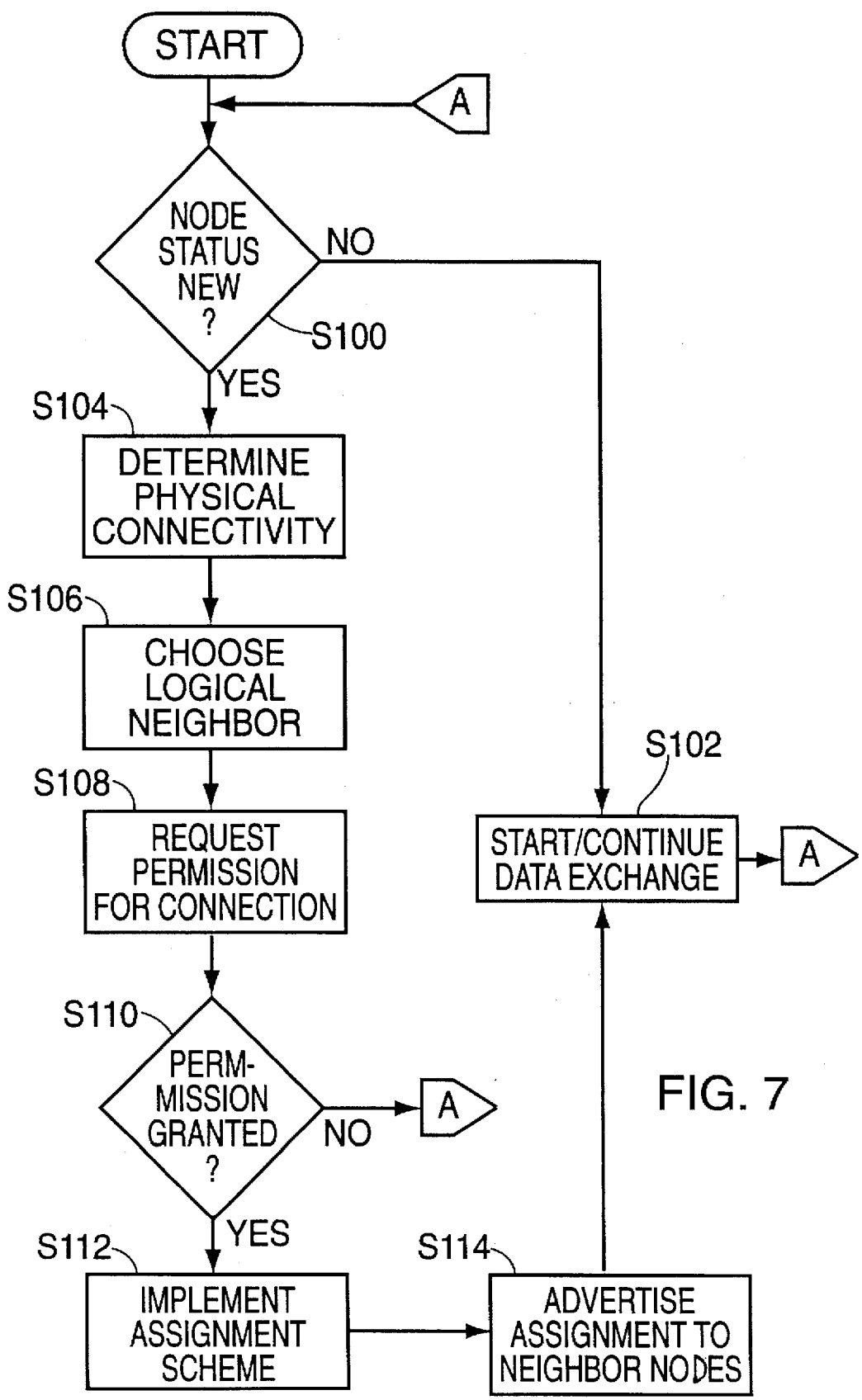
FIG. 7 is a flow diagram depicting the operation of the node of FIG. 2 in accordance with the invention.

FIG. 7 is a flow diagram depicting operations carried out by the processor/controller unit 30 in a network node (see FIG. 2), in accordance with the invention. By definition, node-status is "new" when a specific node desires to establish or activate one or more logical links with other nodes, for example, when entering the network, after movement to a new location or recovery from a failure, and the like. Otherwise, the node status is "old" and the node, e.g., can start/continue to exchange data through established links.

A determination is made whether or not the node status is new (step S100). If so, the node (e.g., node 1) broadcasts via a management channel a connectivity message, e.g., "do you hear me?" and waits for acknowledgements from nearby nodes. After acknowledgements are received, node 1 determines its physical connectivity, i.e., those nodes which are within "hearing" distance from node 1 (step S104). Next, node 1 chooses a neighboring node (e.g., node 2) with which it desires to activate a link based on pre-established requirements (step S106). Node 1 then requests permission to establish a logical link with node 2 (step S108).

If permission is granted (step S110), the originating node 1 invokes the present assignment scheme and determines on which time-slot to communicate with the contacted node 2 (step S112). Note that it is assumed here that each node in the network is aware of existing assignments at its neighboring nodes. Using the management channel, node 1 sends this information (the determined time-slot $t_k$) to node 2 and awaits information from node 2 with respect to which frequency-code values are in use by nodes neighboring node 2 in the time slot $t_k$. Once node 1 receives this information, the node again uses the present scheme to determine which frequency-code value to use during $t_k$, and notifies node 2 of the chosen frequency-code value. Nodes 1 and 2 then advertise their new link assignment to their neighbors through the management channel (step S114), and nodes 1 and 2 may then start to exchange data over the established link (step S102). While maintaining a link with node 2, node 1 may return to step S100 and establish new logical links with other neighboring nodes.

If in the foregoing process permission is not granted in step S110 for node 1 to link with node 2, node 1 can return to step S100 and choose another neighboring node repeating the foregoing steps.

The present assignment scheme uses at most (2Δ–1) time slots, and (2M–1) frequency-code values, where is the maximum number of logical links that can be activated by each node, and M is the maximum number of physical links of any node (M≧Δ). For a given physical topology, the number of physical links (and neighbors) each node may have is determined by its transmission radius.

Implementation of the present scheme may be carried out through operation of the processor/controller units 30 which are resident in the nodes together with associated working and storage memory, to assign available time-slots and frequency-code values to links as they are formed. A control function that initially selects up to Δ logical links to be formed out of a maximum of M physical links (Δ≦M), is assumed to be given. Such selection may be performed on the basis of various requirements imposed on the network, e.g., to adapt to specific traffic patterns, to activate higher priority links, or to form certain logical topologies.

The present link assignment scheme realizes significant advantages. Namely;

1. Assignments of existing links are not rearranged when new links are activated. This eliminates the need for an overall network link assignment re-computation because of node mobility or network entry.

2. The present assignment scheme is a distributed one. The scheme can be invoked by a node which desires to activate a specific link, and the scheme can be executed concurrently by many nodes in a network. New links are assigned based on existing assignments involving at most 2M neighboring nodes.

3. The present scheme is suitable for any size network. Not more than (2Δ–1) time slots and (2M–1) frequency-code values are used (M≧Δ), independent of the number N of nodes.

4. The present scheme has a run time which is proportional to MΔ.

5. Flexible Directivity—a specific link (i–j) can be directed (i→j), (i←j) or (i⇌j), i.e., uni-directional or bi-directional, independently of the assignments of other links.

6. Flexible allocation of Tx/Rx times—each link can split arbitrarily its time-slot for transmission in a specific direction when operating in a half-duplex mode, dynamically and independently of other link assignments. This means that the utilization of every unidirectional link can be adjusted to its traffic flow, resulting in a minimum end-to-end delay.

7. Reduced schedule size—using TDMA, FDMA, and CDMA results in reduced schedule size from o(MΔ)(pure TDMA) to o(Δ).

8. Increased throughput—by a factor of o(M) compared to pure TDMA networks.

9. Security/interference control—neighboring nodes that transmit on the same time-slot can use selected non-adjacent frequencies.

While the foregoing description represents a preferred embodiment of the invention, it will be obvious to those skilled in the art that various changes and modifications may be made, without departing from the true spirit and scope of the invention as pointed out in the following claims.

We claim:

1. A method of assigning transmission parameters when establishing a link (i–j) between two nodes i, j in a communications network, whereby potential conflicts and interference with other nodes of the network that neighbor the nodes i, j are avoided, the method comprising the steps of:

assigning a time slot $t_k$, and a frequency-code value $(f, c)_1$ to a link (i–j) between a pair of nodes i, j, in a communications network, by first choosing from a set T an available time slot $t_k$ which is not in use for links established between node i and nodes neighboring node i, or for links established between node j and nodes neighboring node j, wherein k connotes a currently chosen time-slot;

second choosing from a set FC an available frequency-code value $(f, c)_1$ which is not, during the chosen available time slot $t_k$, in use by a node that neighbors node i, or by a node that neighbors node j, wherein 1 connotes a currently chosen frequency-code value; and returning, if no frequency-code value $(f, c)_1$ is available during a chosen time slot $t_k$, to said first choosing step after removing $t_k$ from the set T of available time slots; wherein T is a defined set of available time slots (t) during which links in the communications network can be activated; and FC is a defined set of frequency-code values (f, c) each of which defines a frequency or a frequency-code pair for association with the links in the communications network.

2. The method of claim 1, wherein member time slots $t_k$ of the set T are each ordered by a different assigned order number k, and said first choosing step includes choosing said time-slot $t_k$ with k being a least order number assigned to a currently available time slot.

3. The method of claim 1, wherein member frequency-code values $(f, c)_1$ of the set FC are each ordered by a different assigned order number 1, and said second choosing step includes choosing said frequency-code value $(f, c)_1$ with 1 being a least order number assigned to a currently available frequency-code value.

4. The method of claim 1, including implementing a distributed link assignment of said time slots and said frequency-code values, by providing such network management information that when node i is to be linked with node j, the nodes i, j can establish the link (i–j) by determining existing time slot and frequency-code value assignments to nodes neighboring node i and node j, assigning an available time slot $t_k$, and an available frequency-code value $(f, c)_1$ to the link (i–j), and informing nodes neighboring node i and node j of the time slot $t_k$ and the frequency-code value $(f, c)_1$ assigned to the link (i–j).

5. The method of claim 1, including incorporating in the communications network nodes that are mobile relative to other nodes in the network.

6. The method of claim 1, including determining aggregate bandwidth requirements of each of the linked nodes i, j for transmitting information to one another, and dividing the time-slot $t_k$ assigned to the link (i–j) according to said aggregate bandwidth requirements.

7. The method of claim 6, including allocating a portion of said assigned time-slot $t_k$ for a first uni-directional link (i←j) in a first direction, and allocating a remaining portion of the time-slot $t_k$ for a second uni-directional link (i→j) in a second direction opposite said first direction.

8. The method of claim 7, wherein said allocating step is carried out by enabling each of the nodes i, j to notify the other of its aggregate transmission bandwidth requirement, and defining a time slot splitting ratio $\{T_{i\to j}:T_{i\leftarrow j}\}$ for the first and the second uni-directional links to be equal to $$\{\tfrac{1}{2}+(\lambda_i-\lambda_j)/2C\}:\{\tfrac{1}{2}-(\lambda_i-\lambda_j)/2C\}$$

wherein the total capacity of bi-directional link (i–j) is C;

the aggregate transmission bandwidth needs of nodes i and j are $\lambda_i$ for unidirectional link i→j, and $\lambda_j$ for unidirectional link i←j;

$C \geq \lambda_i + \lambda_j$; and $\lambda_i \geq \lambda_j$.

9. The method of claim 1, comprising:

allocating a portion of an assigned time-slot $t_k$ for a first uni-directional link (i→j) in a first direction, and allocating a remaining portion of the time-slot $t_k$ for a second uni-directional link (i←j) in a second direction opposite said first direction;

said allocating steps being carried out by enabling each of the nodes i, j to notify the other of its aggregate transmission bandwidth requirement, and defining a time slot splitting ratio $\{T_{i\to j}:T_{i\leftarrow j}\}$ for the first and the second uni-directional links to be equal to $$\{\tfrac{1}{2}+(\lambda_i-\lambda_j)/2C\}:\{\tfrac{1}{2}-(\lambda_i-\lambda_j)/2C\}$$

wherein the total capacity of bi-directional link (i–j) is C;

the aggregate transmission bandwidth needs of nodes i and j are $\lambda_i$ for unidirectional link i→j, and $\lambda_j$ for unidirectional link i←j;

$C \geq \lambda_i + \lambda_j$; and $\lambda_i \geq \lambda_j$.

10. A node structure for each of a number of nodes in a communications network, wherein said structure enables transmission parameters including time slots and frequency-code values to be assigned to a link (i–j) between a pair of nodes i, j to be linked, and avoids potential conflicts and interference with other nodes that neighbor the nodes i, j; said node structure comprising:

transmitter means for transmitting information to other nodes including nodes with which a link is desired;

receiver means for receiving information from said other nodes; and controller means coupled to said transmitter means and to said receiver means for (a) acquiring through said receiver means information corresponding to existing time slot and frequency-code value assignments at each neighboring node, (b) first choosing from a set T an available time slot $t_k$ which is not in use for links established between node i and nodes neighboring node i, or for links established between node j and nodes neighboring node j;

(c) second choosing from a set FC an available frequency-code value $(f, c)_1$ which is not, during the chosen available time slot $t_k$, in use by a node that neighbors node i, or by a node that neighbors node j;

(d) returning, if no frequency-code value $(f, c)_l$ is available during the chosen time slot $t_k$, to said first choosing step after removing $t_k$ from the set T of available time slots; and (e) assigning a chosen time slot $t_k$, and a chosen frequency-code value $(f, c)_l$ for a link (i–j) between the nodes i, j; wherein k denotes a currently chosen time-slot;

l denotes a currently chosen frequency-code value;

T is a defined set of time slots (t) during which links in the network can be activated, and FC is a defined set of frequency-code values (f, c) each of which specifies a frequency or a frequency-code pair for association with the links in the network.

11. The node structure of claim 10, wherein the controller means of node i and node j include means for informing, through said transmitter means, nodes neighboring node i and node j, respectively, of the time slot $t_k$ and the frequency-code value $(f, c)_l$ assigned to the link (i–j).

12. The node structure of claim 10, including means for allowing nodes of the communications network to be mobile relative to other nodes within the network.

13. The node structure of claim 10, wherein said controller means includes means for determining aggregate bandwidth requirements needed for each of the linked nodes i, j to transmit information to one another, and means for dividing the time-slot $t_k$ assigned to the link (i–j) according to said aggregate bandwidth requirements.

14. The node structure of claim 13, wherein said controller means includes means for allocating a portion of said assigned time-slot $t_k$ for a first uni-directional link (i→j) in a first direction, and for allocating a remaining portion of the time-slot $t_k$ for a second uni-directional link (i←j) in a second direction opposite said first direction.

15. The node structure of claim 14, wherein said allocating means includes means for enabling each of the nodes i, j to notify the other of its aggregate transmission bandwidth requirement, and for defining a time slot splitting ratio $\{T_{i \to j} : T_{i \leftarrow j}\}$ for the first and the second uni-directional links to be equal to $$\{½+(\lambda_i-\lambda_j)/2C\} : \{½-(\lambda_i-\lambda_j)/2C\}$$

wherein the total capacity of bi-directional link (i–j) is C;

the aggregate transmission bandwidth needs of nodes i and j are $\lambda_i$ for unidirectional link i→j, and $\lambda_j$ for unidirectional link i→j;

$C \geq \lambda_i + \lambda_j$; and $\lambda_i \geq \lambda_j$.

16. A method of dynamically and flexibly dividing a time-slot of a given duration assigned for communication among a pair of nodes in a communications network, comprising:

allocating a portion of an assigned time-slot $t_k$ of given duration T for a first uni-directional link (i→j), and allocating a remaining portion of the duration T of the time slot $t_k$ for a second uni-directional link (i←j);

said allocating steps being carried out by notifying each of the nodes i, j of their aggregate transmission bandwidth requirements, and defining a flexible splitting ratio $\{T_{i \to j} : T_{i \leftarrow j}\}$ of the time slot duration T for implementing the first and the second uni-directional links, the ratio being equal to $$\{½+(\lambda_i-\lambda_j)/2C\} : \{½-(\lambda_i-\lambda_j)/2C\}$$

wherein the total capacity of bi-directional link (i–j) is C;

the aggregate transmission bandwidth needs of nodes i and j are $\lambda_i$ for unidirectional link i→j, and $\lambda_j$ for unidirectional link i←j;

$C \geq \lambda_i + \lambda_j$; and $\lambda_i \geq \lambda_j$.

17. The method of claim 16, wherein the step of notifying the nodes i, j of their transmission bandwidth requirements is carried out by exchanging corresponding information between the nodes i, j.

* * * * *